Fig.24
COLOR INSTRUCTION SIGNAL

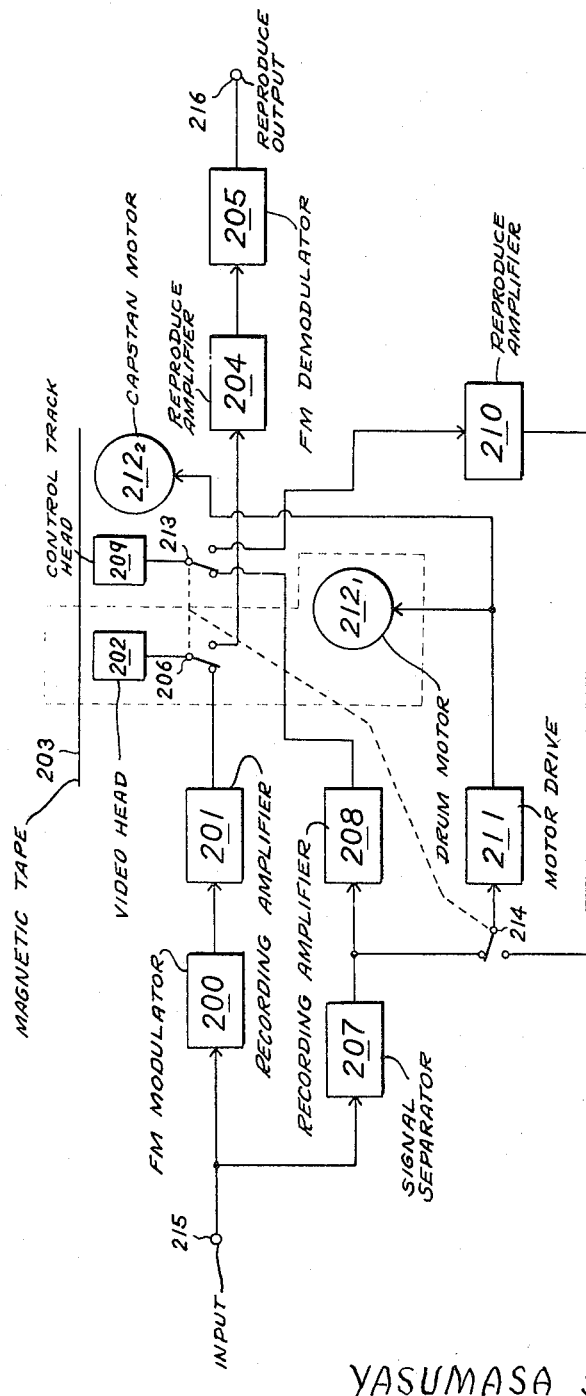

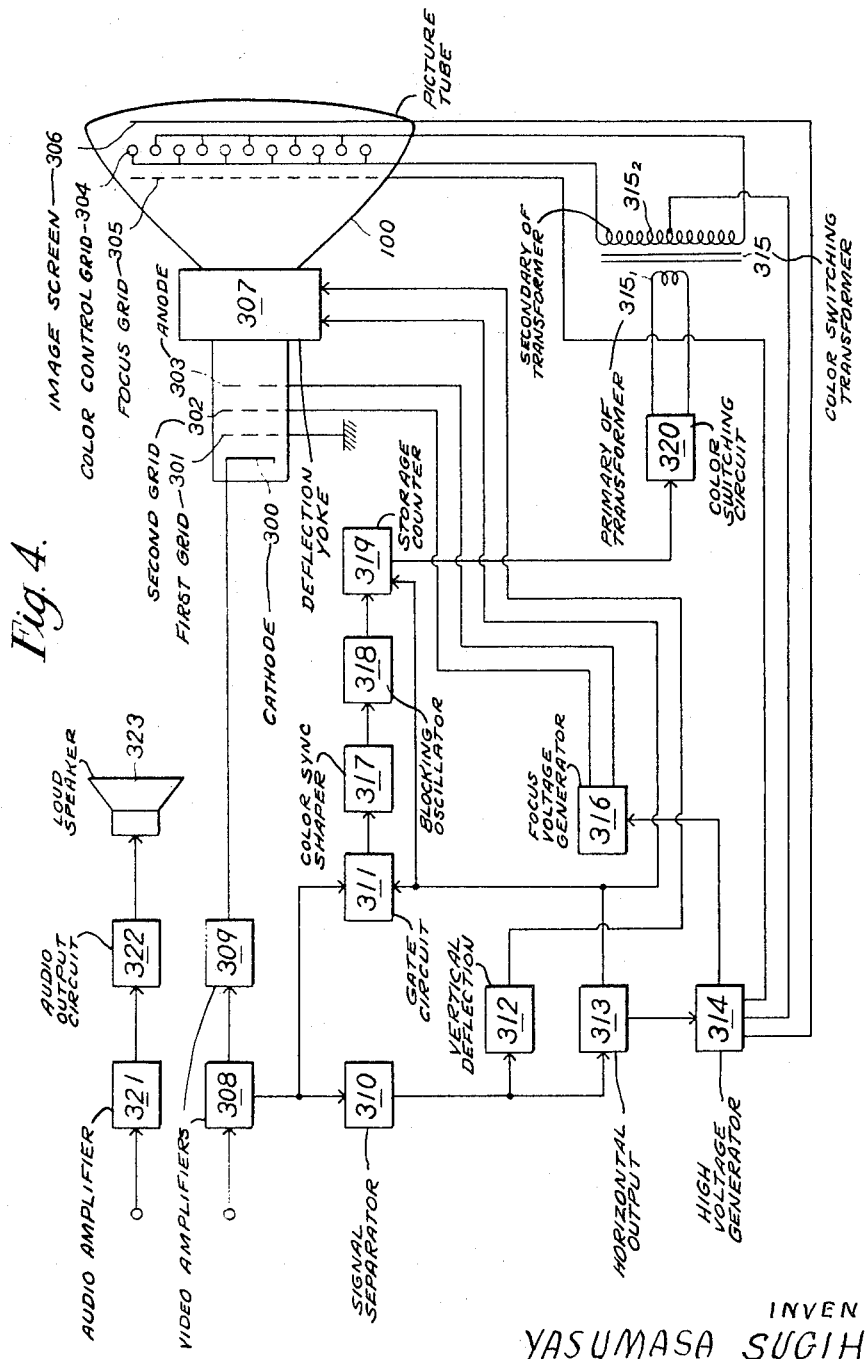

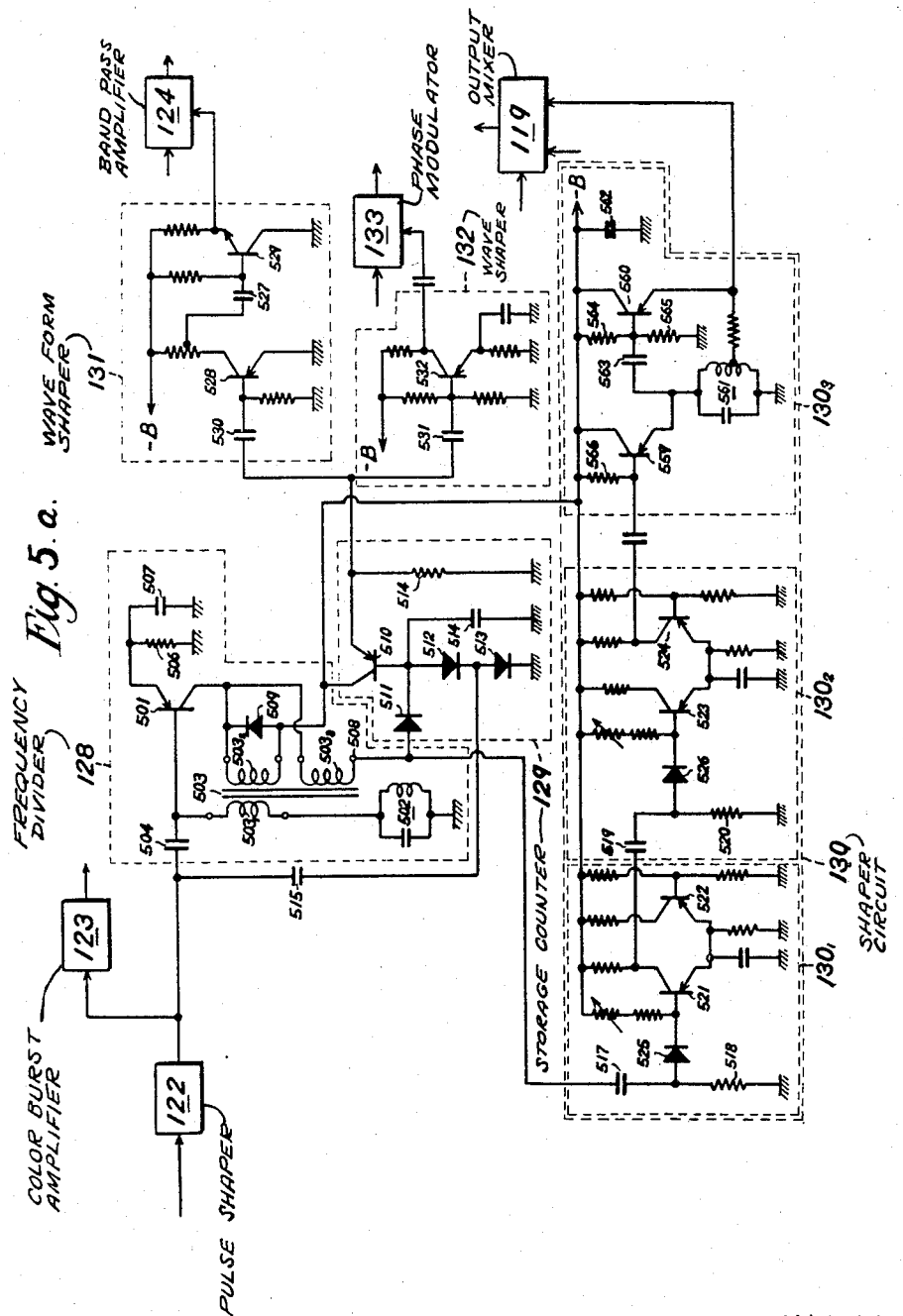
Fig. 5.a.

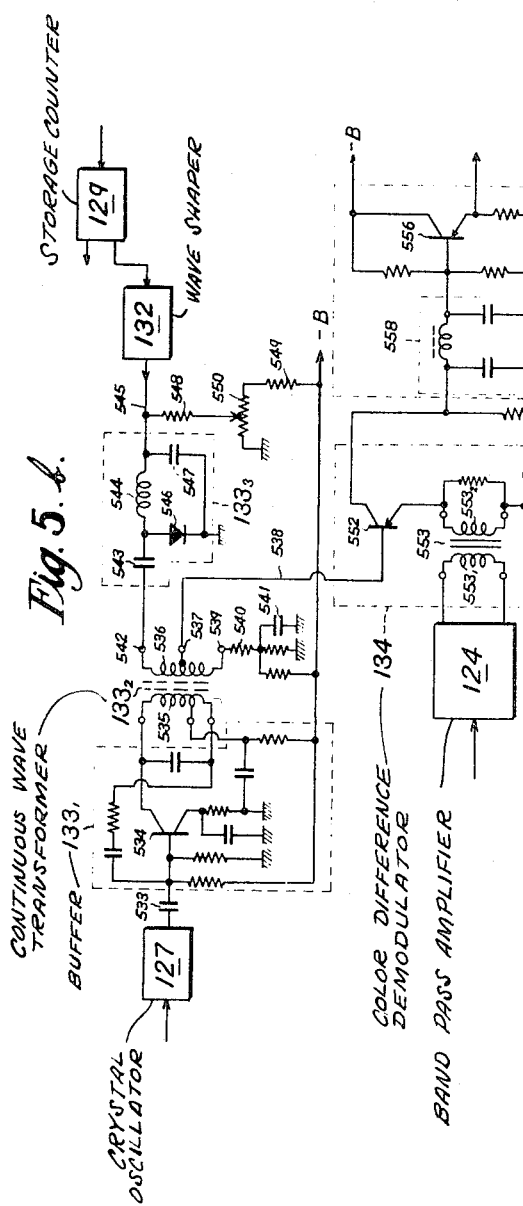
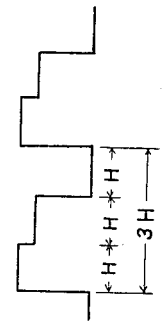
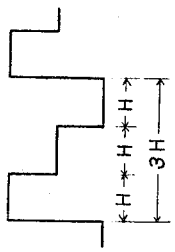
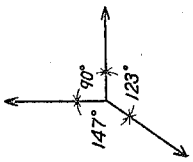

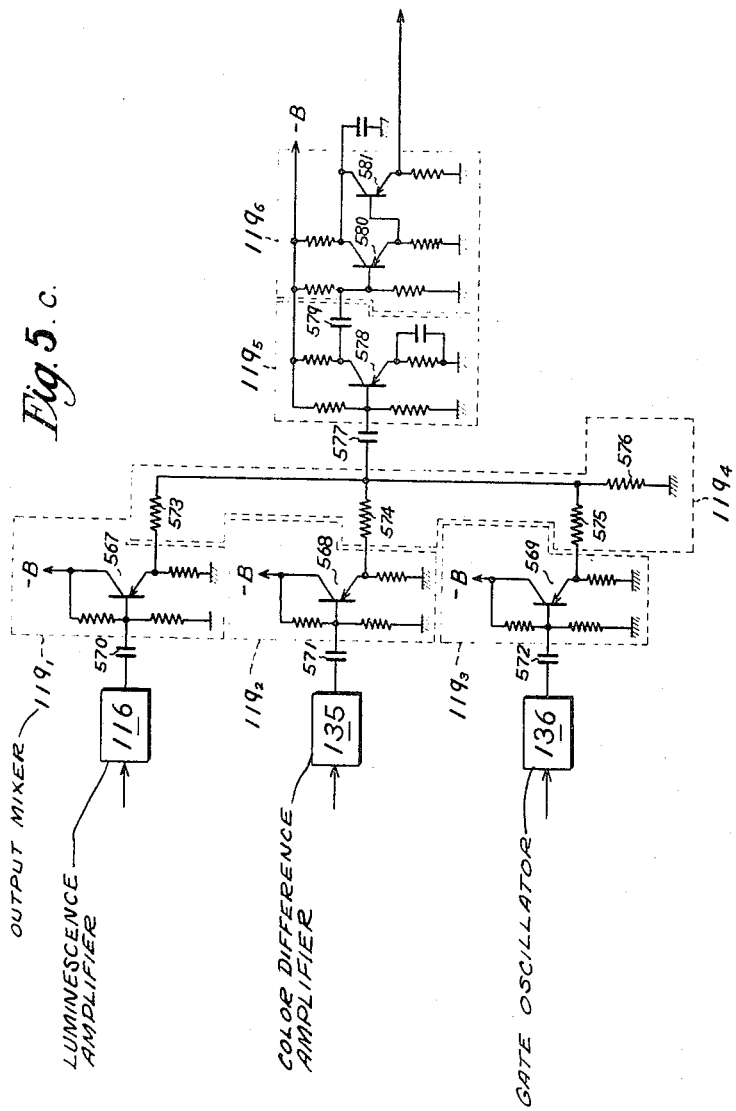

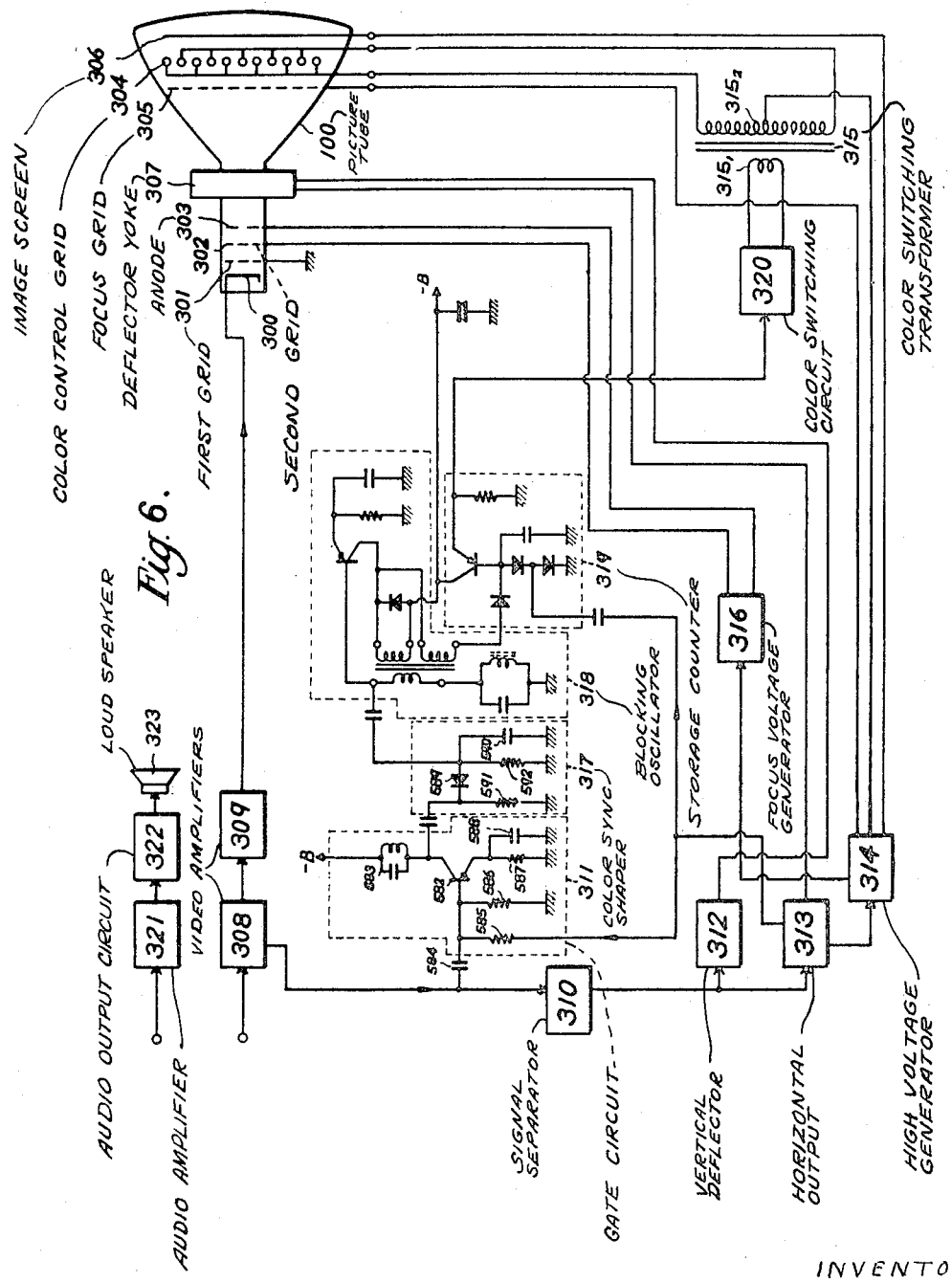

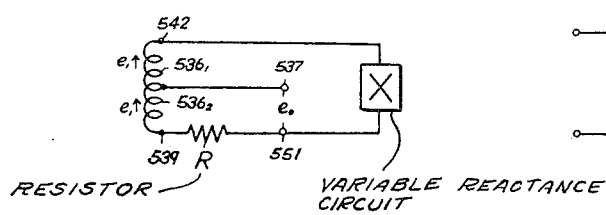
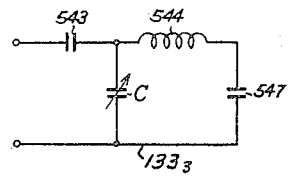
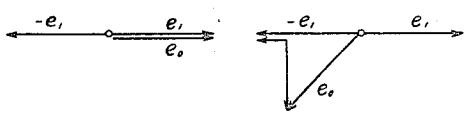
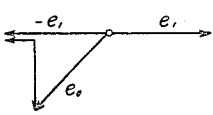
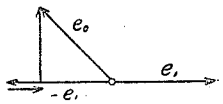
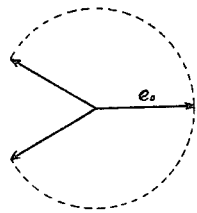

Fig.25

Fig.26
3H COMPENSATING PULSE
APPLIED TO BLOCKING OSCILLATOR

Fig.27 — STEPPED COMBINED OUTPUT SIGNAL

INVENTOR
YASUMASA SUGIHARA
By Linton and Linton
ATTORNEYS

United States Patent Office 3,440,340
Patented Apr. 22, 1969

3,440,340
COLOR TELEVISION SIGNAL RECORDING AND
REPRODUCING SYSTEM
Yasumasa Sugihara, Kawasaki-shi, Japan, assignor to The
General Corporation, Kawasaki-shi, Japan, a corporation of Japan
Filed Aug. 3, 1965, Ser. No. 476,827
Claims priority, application Japan, Aug. 19, 1964,
39/46,172
Int. Cl. H04n 5/38, 5/44
U.S. Cl. 178—5.4       4 Claims

ABSTRACT OF THE DISCLOSURE

The present invention relates to a line-sequential system of color television, which includes no sub-carriers and has a characteristic substantially similar to a monochrome television signal, and hence this signal may be recorded like a simple monochrome signal. This permits compatible recording/reproducing apparatus. The color switching frequency may be 5 kc.
The color image reproducing unit comprises a voltage generator to receive the standard instruction signal, and convert it into a line-sequential signal, a video recording reproducing apparatus for recording the translated line-sequential signal, and a line-sequential type color image reproducing monitor for reproducing the color image signal. Individual amplifiers and modulators are provided for performing the specific functions. A magnetic recording and reproducing unit is provided for recording the color instruction signals. Synchronized control switches are provided. This system makes it possible to employ a usual monochrome video tape recorder for recording and reproducing a color television signal, and this recording equipment together with the monitoring device or receiver, may be built compactly and of light weight so as to be suitable for the home.

---

This invention relates to a system for recording and reproducing a color television signal, more particularly to such system which may be readily used in connection with the NTSC signal, the SECAM signal as well as the PAL signal.

For purposes of illustration, however, the present invention will be discussed with particular reference to the NTSC signal.

There are known many black-white television receivers capable of reproducing a monochrome picture from a color television signal without substantial modifications of the equipment. This type of receiver is now commonly known as a "compatible color television system," in which a subcarrier wave signal is modulated by a chrominance signal and superimposed with the bandwidth of a brightness signal. This is in common to the NTSC, SECAM and PAL systems. Extensive research has been made to explore the possibility of a recording and reproducing system for such multiplex color television signal using a subcarrier wave, and video tape recording apparatus of various types for this purpose are now commercially available.

As is well known, the NTSC signal comprises a brightness or luminance component and a chrominance component, the latter consisting of I and Q signals with which to balance-modulate a 3.58 mc. subcarrier. The NTSC signal may be expressed in terms of the following:

$$Ey = 0.30Er + 0.59Eg + 0.11Eb$$

$$Ei = 0.60Er - 0.28Eg - 0.32Eb$$

$$Eq = 0.21Er - 0.52Eg + 0.31Eb$$

$$Em = Ey + \frac{1}{2.03}(Eb - Ey)\sin wt + \frac{1}{1.14\lambda}(Er - Ey)\cos wt$$

where:
$Er$ = Red color component
$Eg$ = Green color component
$Eb$ = Blue color component
$Ey$ = Luminance signal
$Ei$ = I-signal component
$Eq$ = Q-signal component
$Em$ = NTSC signal NOTE.—"E" commonly denotes a voltage.

In the above formulae, the values "1.14" and "2.03" represent compression factors which are used at the time of signal formation and compensated for at the time of reproduction.

Attempt to record directly on and reproduce from a magnetic tape such composite signal involves a number of problems. Any appreciable variations in tape speed or dimensional changes in the tape per se would introduce a variation in the phase of the subcarrier with the result that it is difficult to make a recording and reproduction of the color image with reasonable fidelity. Special devices may also be required to eliminate these difficulties but will tend to complicate or increase the size and hence, cost of a color image recording and reproducng equipment of this type.

Following the recent trend to transistorization or otherwise rendering compact the electronic equipment and devices, the demands are voiced for competitively small color image recording and reproducing systems. At the same time, the demands are also directed toward compatible monochrome/color video tape recorders.

According to the invention, the above demands are fully met by the combination of a compact, closed-circuit magnetic recording and reproducing equipment about the size of a conventional monochrome video recorder with a small color television receiver operating on the principles of a three-primary color line-sequential system. The equipment according to the invention essentially comprises a transducer unit adapted to translate a composite video signal into a line-sequential color signal, a magnetic recording and reproducing unit adapted to record and reproduce the line-sequential signal from the transducer unit and a single-electron gun type of picture tube such as of Lawrence tube adapted to develop a color image from the line-sequential video signal.

In reproducing the color image utilizing a picture tube of the type having a single electron gun such as that known as Lawrence tube, the so-called dot-sequential system has hitherto been employed. This dot-sequential reproducing system is characterized by application of a sinusoidal wave voltage of a color subcarrier frequency (3.58 megacycles) to the color control grids thereby to cause the beam to deflect and strike the different phosphor strips.

The above-mentioned dot-sequential reproducing system utilizing such sinusoidal voltage presents certain difficulties. It requires the electron beam to be switched extremely instantaneously from one phospher strip group to another, and should this be accomplished, the continuously emitted beam is caused by the sine wave voltage applied to the color control grids to scan the screen intermediate between one group of phosphor strips and another at each horizontal scanning period, with the result that the color images fail to appear at predetermined spots on the screen and the proportions of individual hues are disturbed which necessitates the blanking of color at certain spots on the screen. To eliminate these difficulties, it becomes necessary to switch the electron beam exactly at such precise instant at once and to maintain an intermittent emission thereof thereby to permit the different phosphor strips to transmit their respective ones of the three primary colors in a dot sequence. The term "dot sequential system" is in effect derived from this approach.

In order to satisfy the above-described conditions, it will be further necessary to apply to the cathode, first control grid or second control grid of the picture tube a gate signal of the type having the same frequency as and such phase relation to the color subcarrier as to permit the discontinuation of the electron beam at predetermined time points or a gate signal of the type having a frequency three times that of the subcarrier and such phase relation thereto as to permit the discontinuation of the beam at predetermined time points, said gate signal being detected either before or after application to the picture tube.

To discontinue the emission of the electron beam in the manner described will result in reduced utilization of the beam, hence reduced brightness of the image reproduced on the screen. Furthermore, the use of such sinusoidal wave of the subcarrier frequency for switching the color control grids tends to increase the power for the color switching signal which in turn develops objectionable radiations to interfere with other communications equipment or color television receivers near at hand. And, furthermore, such approach necessarily makes the color image reproducing system more complicated with additional two or three color-demodulation circuits and gate circuits.

On the other hand, in accordance with the invention, the so-called line-sequential system is used for the reproduction of a color image. In this system, the color video signal translated into a line-sequential signal includes no subcarriers and has a characteristic substantially similar to a monochrome television signal, hence such line-sequential signal may be readily recorded on a relatively simple monochrome recording equipment. This permits of the combination of a monochrome video recorder with a line-sequential type of color receiver which provides a unique color video recording/reproducing apparatus.

In the line-sequential system so termed herein, the three primary color signals "R," "G," "B," "R," "G," "B" and so on are reproduced in that order at each horizontal scanning line period, so that the color switching takes place during the flyback line period without the electron beam gated during the scanning period. As a result, the rate of utilization of the beam is considerably increased and hence, the reproduced image is bright and clear. The color switching frequency is as low as about 5 kilocycles, hence the power required for controlling the color signal arrangement is small enough to hold the undesirable radiation to a minimum which would otherwise interfere with other communications equipment near at hand.

With the sequence of color signals set in the order of "R," "G" and "B" and further with a color instruction signal inserted to determine the position of "R," for example, when translating the NTSC signal into a line-sequential color signal, it is possible to reproduce the televised color image high in fidelity by scanning the specific color component on a reproduce monitor whose color sequence is similarly set, according to the instruction signal.

Now, apparatus employed to carry the invention into practice comprises a combination of a transducer unit, a magnetic recording/reproducing unit and a single-electron gun type of color picture tube, as already mentioned.

The transducer unit constituting an essential part of the invention comprises: a circuit device adapted to receive a radio-frequency signal and derive therefrom a composite video signal including a chrominance component, a brightness component, a color burst component and a synchronizing component; a circuit device adapted to derive the color bust signal from the composite video signal thereby obtaining a reference signal of a subcarrier frequency, said reference signal being of successive cycles having the same frequency as a color subcarrier and a predetermined phase with respect to the burst signal; a voltage generator adapted to derive the synchronizing signal from the composite signal generate a voltage having a frequency of one-third of a horizontal scanning frequency and having a three-stepped waveform; a phase modulation circuit adapted to phase-modulate the reference signal with the three-stepped waveform voltage thereby providing three successive reference signals differing in phase at each horizontal scanning period with respect to each other but in the same sequence; a circuit means for deriving the chrominance signal component from the composite video signal and demodulating the same with the output of the phase-modulation circuit thereby providing color-difference signals of line-sequence; a signal generator adapted to receive the synchronizing signal component from the composite video signal for generation of a color instruction signal to determine the position of a color component having a cycle corresponding to three horizontal scanning cycles, and a circuit means for deriving the brightness signal component from the composite video signal and mixing the line-sequential color-difference signals with the instructional signal.

The color image reproducing unit constituting another essential part of tthe invention comprises; a voltage generator adapted to derive the instruction signal from the line-sequential color image signal for generation of a voltage having three steps in its waveform each of which corresponds to one horizontal scanning; a signal generator adapted to derive the synchronizing signal component from the line-sequential color image signal for generation of horizontal and vertical deflection signals to develop a raster on the picture tube, and a Lawrence tube type, single-electron gun picture tube for reproducing thereon a color image upon reception of the line-sequential color image signal, three-stepped waveform voltage, and horizontal and vertical deflection signals.

In a color television receiver utilizing a single-electron gun known as Lawrence tube, as in the case of this invention, there are also applied a screen voltage and a focus voltage, but this has not direct bearing upon the systems of the invention.

A circuit concept considered preferable in accordance with the invention for the present generation of the stepped-waveform voltage comprises a storage counter. The phase-modulation circuit may be preferably a continuous wave transformer having an intermediate tap at the secondary winding and having connected between the ends of the secondary winding a circuit means consisting of a condenser and a coil, said circuit means having its reactance variable with the three-stepped waveform voltage. With this arrangement, the desired phase-modulated reference signal (detection axis) may be derived from a closed-circuit formed between the intermediate tap and the secondary winding.

Here, it will be understood that the line-sequential color video signal obtained in the above circuit arrangement is a brightness signal including each individual color component substantially identical with the ordinary monochrome signal and hence, may be readily processed on a relatively narrow band monochrome recording and reproducing apparatus.

It is the primary object of this invention to provide a new, useful color television recording and reproducing system essentially comprising in combination with, a signal transducer for translating the standard color information signal into a line-sequential type of signal, a video recording/reproducing apparatus for recording the translated line-sequential signal and a line-sequential type color image reproduce monitor for reproducing the color image signal.

It is another object of the invention to provide an improved color signal recording and reproducing device including a circuit means for determining the order of individual color components and a circuit means for superimposing an instruction signal upon the standard color signal when translated into a line-sequential type of signal, thereby obtaining a synchronism of component color signals at a color monitor.

For a better understanding of the present invention as to its construction and operation, together with other and further objects thereof, reference is had to the following detailed description of the invention taken in connection with the accompanying drawings, and its scope will be pointed out in its appended claims.

In the drawings illustrating a preferred embodiment of the invention:

FIG. 3 is a block diagram illustrating a typical arrangement of a conventional monochrome television signal recording and reproducing apparatus;

FIG. 4 is a block diagram illustrating a color television receiver for reproducing the color image from the line-sequential signal;

Figure 14:
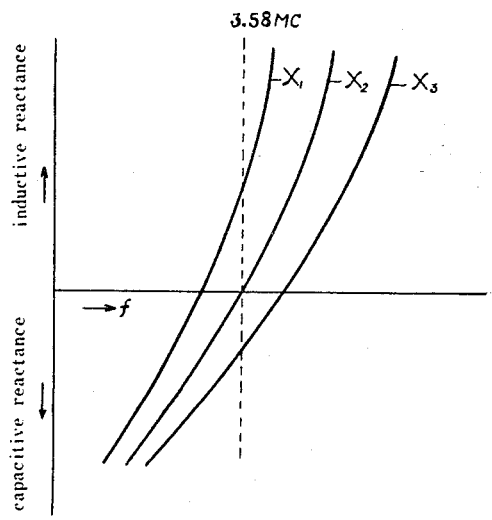
Figure 15:
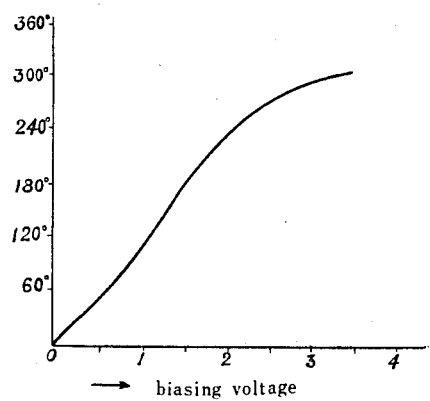
Figure 16:
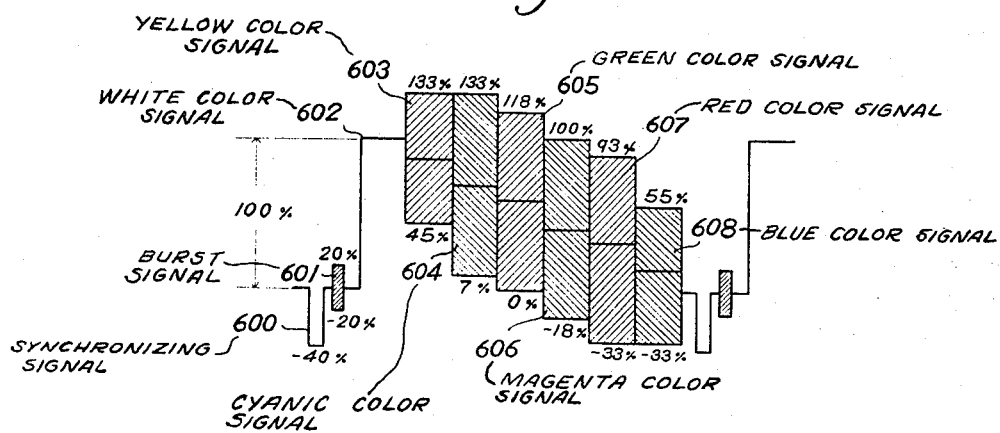
Figure 17:
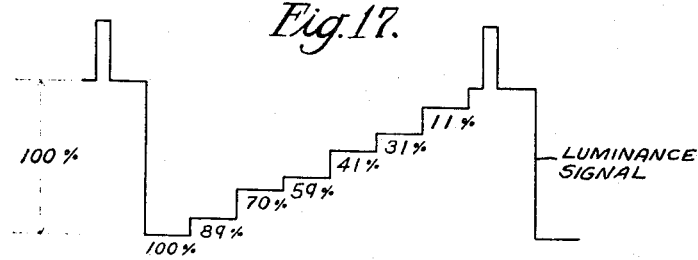
Figure 18:
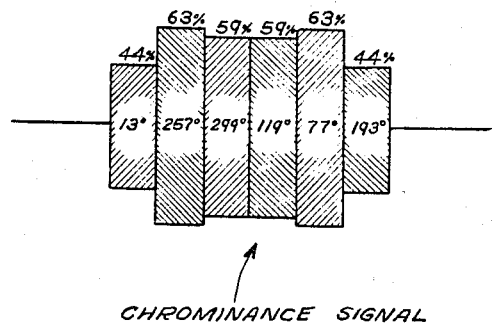

FIGS. 5(a)–(c), inclusive, are circuit diagrams illustrating the essential portions of the transducer unit;

FIG. 6 is a circuit diagram partially in block illustrating the essential portions of the color television receiver;

FIG. 7 is a circuit diagram schematically illustrating the phase-modulation circuit;

FIG. 8 is a circuit diagram schematically illustrating a variable reactance circuit forming an essential part of the phase-modulation circuit;

FIGS. 9(a)–(c), inclusive, and FIG. 10 are vector diagrams utilized to explain the operation of the phase-modulation circuit;

FIG. 11 vertically illustrates the range of phase-modulation of the reference signal (detection axis);

FIGS. 12 and 13 illustrate the waveforms of the stepped-waveform voltage;

FIG. 14 graphically illustrates the reactance characteristic of a variable reactance circuit in the phase-modulation circuit;

FIG. 15 is a characteristic curve illustrating the phase shift noted when changing the bias to a variable-capacity diode in the variable reactance circuit;

FIG. 16 is a schematic diagram illustrating the color burst signal;

FIG. 17 is a schematic illustrating the waveform of a brightness signal output;

FIG. 18 is a schematic diagram illustrating the chrominance signal; and

FIGS. 19–27, inclusive, illustrate the signal waveforms at different stages of operation of the system embodying the invention.

Figure 1:
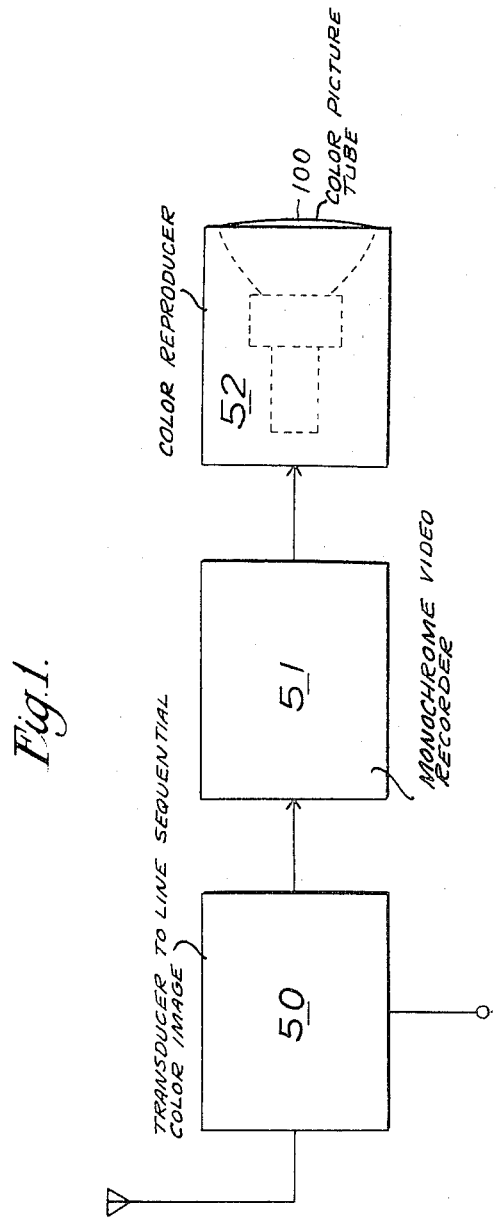
FIG. 1 is a schematic block diagram illustrating the general construction of a color television signal recording and reproducing system.

Reference is first had to FIG. 1 which illustrates the three essential systems forming a complete equipment set-up for the recording and reproduction of a color television signal according to the invention; namely, a transducer unit 50 adapted to translate the NTSC signal into a line-sequential color image signal, a monochrome video recorder 51 for recording and reproducing the line-sequential color signal from the transducer unit 50 and a color image reproduce or television receiver 52 including a color picture tube 100 for the reproduction of a color image carried on the line-sequential signal from the video recorder 51. Detailed illustration of each of the three units are given in FIGS. 2 through 6.

Figure 2:
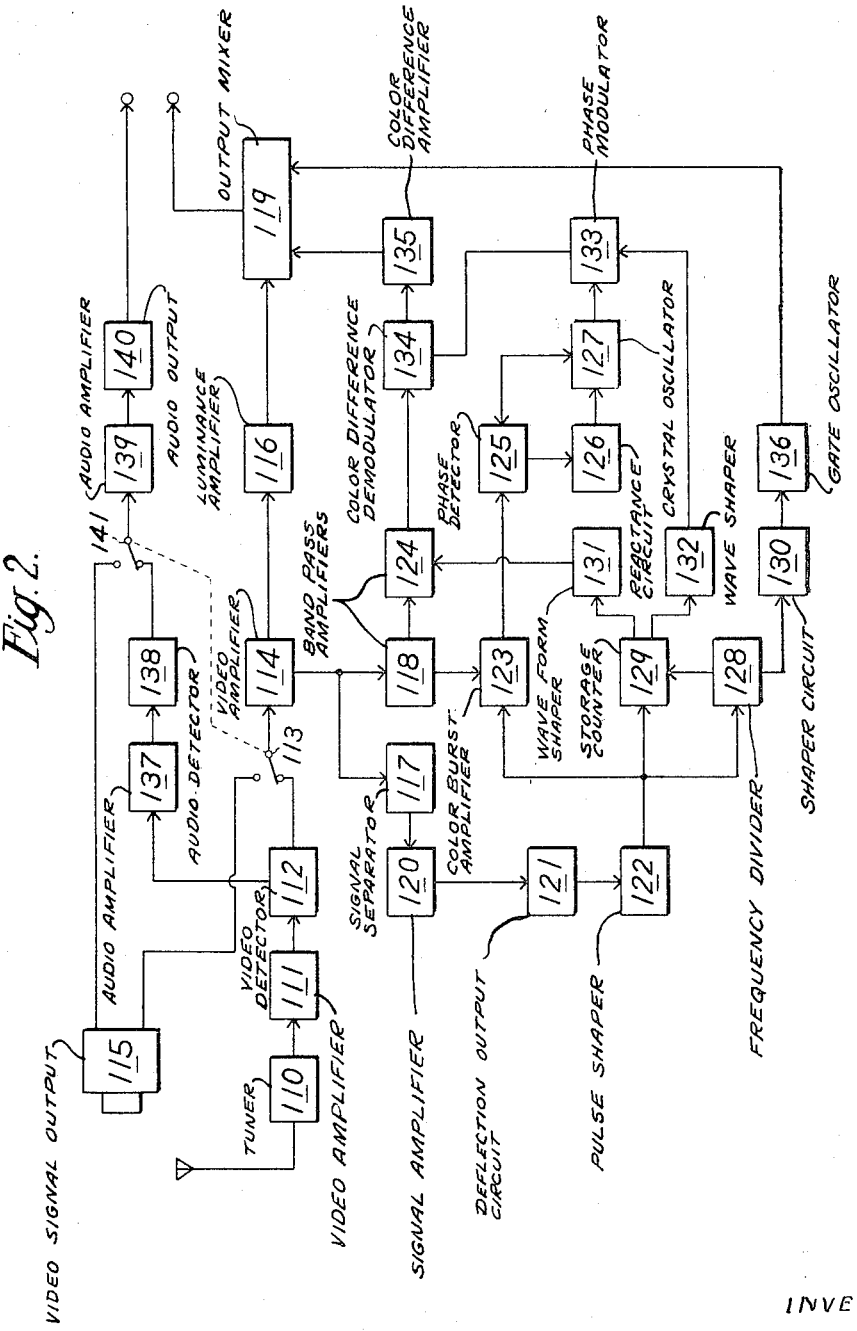
FIG. 2 is a block diagram illustrating the transducer unit embodying the invention for translating the standard color television signal such as the NTSC signal into a line-sequential color image signal.

In FIG. 2 illustrating the signal transducer 50, the incoming color television signal is caught by the tuner 110 which comprises an input circuit, a high-frequency amplifier, a frequency converter and a local oscillator. An NTSC signal of a certain frequency is derived in this tuner circuit from the color television signal, amplified and frequency-converted for application to an intermediate video frequency amplifier 111. The output from this amplifier 111 is fed to a video detector 112 where a composite signal is derived from the intermediate frequency signal. The composite signal thus obtained is fed through a switch 113 to a video amplifier 114.

To this video amplifier 114 is also directly applied a color composite video signal output 115 through the switch 113. The switch 113 is adapted to selectively switch between the output of the video detector 112 and the direct color composite video signal output 115.

The composite video signal referred to herein includes a video signal comprising a brightness or luminance component and a chrominance component, a synchronizing signal and a color burst signal.

The video amplifier 114 derives the luminance signal component from the composite video signal for application to a luminance signal amplifier 116 having a delay circuit for compensating a time shift with respect to a color-difference signal (this signal is described hereinafter in detail), simultaneously as the composite video signal is applied to synchronizing signal separator 117 and to a first band-pass amplifier 118.

The luminance signal, after being amplified and corrected in timing by the signal amplifier 116, is applied to a mixer circuit 119. On the other hand, the synchronizing signal is derived from the composite video signal at the sync separator 117 and amplified at a synchronizing signal amplifier 120 for application to a horizontal-and-vertical deflection output circuit 121 where the oscillating circuit is energized in response to the synchronizing signal. The oscillation output is applied to a horizontal pulse shaper 122.

The first band-pass amplifier circuit 118 supplies the chrominance signal component in part to a color burst amplifier 123 while deriving the chrominance signal within a ±500 kilocycle band for application to a second band-pass amplifier 124.

The horizontal pulse from the horizontal pulse shaper 122 is applied to the color burst amplifier 123 where a color burst signal is derived for application to a phase detector 125. The phase detector 125 forms a loop with a reactance circuit 126 and a crystal oscillator 127. The color burst signal thereby phase-modulated is applied through the reactance circuit 126 to control the oscillation output of the crystal oscillator 127 so as to develop a desired reference signal having a color subcarrier frequency, viz a continuous wave signal 3.58 megacycles having the same frequency as the color subcarrier and a phase predetermined with respect to the burst.

The above circuit arrangement is substantially the same as that of a conventional monochrome or color television receiver except for the switching circuit 113 and hence, will be omitted from the following detailed description of the invention.

The horizontal pulse or output of the horizontal pulse shaper 122 is also supplied to a frequency divider 128 and to a storage counter 129.

The frequency divider 128, upon reception of the horizontal pulse from the shaper 122, generates a pulse shown in FIG. 21 and supplies this pulse to the storage counter 129 and to a delay-and-shaper circuit 130. Here, the horizontal pulse from the shaper 122 has a cycle corresponding to one horizontal scanning cycle and hence, will be herein termed "H-pulse," while the pulse from the frequency divider 128 has a cycle corresponding to three horizontal scanning cycles and hence, will be herein termed "3H-pulse."

The storage counter 129 is thus adapted to receive the "H" pulse from the shaper 122 as well as the "3H-pulse" from the frequency divider 128 and generate a voltage having three steps in its waveform and having a cycle corresponding to one horizontal scanning cycle or period ("H" period). The three-stepped waveform voltage thus generated is applied to waveform shaper 131 and to a demodulated wave shaper 132.

The three-stepped waveform processed through the shaper 131 is supplied to the second band-pass amplifier 124. The shaper 131 is adapted to modify the waveform of the stepped-wave voltage such that the compression factor hereinabove referred to may be compensated for to properly adjust the gain of the second band-pass amplifier 124.

The merits of the stepped-waveform voltage utilized according to the present invention for effecting the necessary compensation of the compression ratio will be obvious from the fact that the three primary color components are caused by a single color-difference demodulator to alternate in the sequence of red, green and blue for every horizontal scanning cycle, for which purpose the said voltage having three steps in its waveform each step corresponding to one horizontal scanning cycle may be suitably modified so that the three stepped portions of the waveform agree with the red, green and blue color component signals, respectively, in that order at the time of demodulation thereof, thereby automatically effecting the gain adjustment.

To the second band-pass amplifier 124 is applied a flyback blanking signal, as this is known in the television art.

The demodulated wave shaper 132 is adapted to modify the stepped waveform of the voltage from the storage counter 129 to the extent of height or potential required for phase-modulation at the phase modulator 133.

The phase modulator 133, upon reception of the thus shaped three-stepped waveform voltage, phase-modulates therewith the reference signal from the crystal oscillator 127 to provide three reference signals different in phase but in the same sequence. These three reference signals are then supplied to a color-difference signal demodulator 134 wherein they are processed to become demodulation axes for the red, green and blue color-difference signals.

The chrominance signal from the second band-pass amplifier 124 is supplied to the demodulator 134, said chrominance signal including the red, green and blue components. Since the three reference signals different in phase with respect to each other are successively applied to the demodulator 134, it follows that the red color-difference signal $(Er-Ey)$, green color-difference signal $(Eg-Ey)$ and blue color-difference signal $(Eb-Ey)$ are subjected to demodulation from the chrominance signal when the red, green and blue reference signals, respectively, are applied to the demodulator 134 in the order mentioned.

A color-difference signal amplifier 135 is adapted to amplify the three successive color-difference signals $$(Er-Ey)$$

$(Eg-Ey)$ and $(Eg-Ey)$ from the demodulator 134 for application to a mixer circuit 119 wherein the color-difference signals are mixed with the luminance signal from the signal amplifier 116 to form a color image signal.

The delay and shaper circuit 130, as already stated, is adapted to adjust the timing of the "3H" pulse from the frequency divider 128. This is accomplished by a delay circuit 130(1) which causes the "3H" pulse to delay as much as required for the color instruction signal to come into the back porch during the horizontal flyback line period and by a shaper 130(2) which determines the width of the color-difference signal required for insertion of the color instruction signal.

A gate oscillator 136 is adapted to oscillate during the duration of the "3H"-shaped pulse to develop an oscillation output (FIG. 24) similar to a burst signal having a cycle corresponding to three horizontal scanning periods. This oscillator output is referred to herein as a "color instruction signal" and is applied to the mixer 119.

In the mixer 119, the chrominance signal is combined with the luminance signal to form a line-sequential color image signal, simultaneously as the color instruction signal is superimposed thereon. Thus, the output of the mixer 119 includes the instruction signal at every three horizontal scanning cycles as shown in FIG. 25.

The color instruction signal as inserted into the line-sequential color image signal is intended to enable the color image reproducing apparatus or television receiver 52 to discriminate between the individual color components so that the color image is reproduced in the correct color sequence.

The line-sequential color image signal has the color instruction signal thus inserted at either of the red, green and blue components thereof that alternate in the same sequence for each horizontal scanning period, said instruction signal being detected at the color television receiver 52 to determine the order of the three primary color components, thus maintaining a color synchronism.

Designated in FIG. 2 at 137 through 140, inclusive, is an audio circuit, of which 137 is an audio intermediate frequency amplifier; 138 is an audio detector; 139 is an audio amplifier and 140 is an audio output circuit. This audio circuit is well known in the art of a monochrome television receiver and will require no further explanation. Designated at 141 is a change-over switch adapted to switch the audio output signal and interlocking with the aforementioned switch 113.

The output of the transducer unit 50 above described or the line-sequential color image signal containing the color instruction signal is substantially the same as the monochrome television signal (i.e. brightness signal) and hence, can be readily recorded and reproduced by a monochrome video tape recorder.

Description now follows in connection with the monochrome video recorder 51 cooperating with the transducer unit 50. The monochrome video recorder shown in FIG. 3 is of the type well known which essentially comprises an FM modulator 200, a recording amplifier 201, a video head 202, a magnetic tape 203, a reproduce amplifier 204, an FM demodulator 205, and a change-over switch 206. This circuit arrangement is well known and will require no further explanation.

Further designated in FIG. 3 illustrating the monochrome video tape recorder 51 at 207 is a synchronizing signal separator, at 208 is a recording amplifier therefor; at 209 is a control track head; at 210 is a reproduce amplifier; at 211 is a motor drive circuit adapted to drive a drum motor 212(1) and a capstan motor 212(2); at 213 is a change-over switch, and at 214 is another change-over switch. These three switches 206, 213 and 214 are interlocked and adapted to be set in the record and reproduce positions all at a time. They are shown in FIG. 3 as in the record mode of operation.

The above video recording apparatus 51 utilized in the present invention is well known in the construction and operation; therefore, no detailed discussion of each mechanical or electrical element thereof is included herein to simplify the description of the essential features of the invention. It suffices here to note that the line-sequential color image signal including the instruction signal may be readily recorded on the apparatus 51 for the reasons set forth above and may be reproduced at the output terminal 216.

Reference is now had to FIG. 4 illustrating the color image reproducing apparatus or color television receiver 52 which may be conveniently termed a "monitor" according to the invention. The apparatus 52 includes a single-electron gun type of picture tube 100 such as Lawrence tube which is well known and hence, will require no further explanation here. For purposes of illustration, however, the reference numerals in FIG. 4 are identified as follows:

Designated at 300 is a cathode; at 301 is a first grid; at 302 is a second grid and at 303 is an anode which are combined to form a device known as an electron gun. At 304 is a color control grid consisting of two sets of line grids; at 305 is a focus grid; at 306 is an image screen and at 307 is a deflection yoke.

The line-sequential color image signal including the instruction signal is supplied from the monochrome video tape recorder 51 to the television receiver 52 wherein it is amplified at a first video amplifier 308 and then at a second video amplifier 309 for application to the cathode 300 of the picture tube 100. The signal at the cathode 300 is directed in the form of an electron beam toward the image screen. In such instance, it is of course necessary that a certain voltage for the formation of an electron beam be applied to the first and second grids 301, 302 and the anode 303.

The output of the first video amplifier 308 is also applied to a gate circuit 311 and to a synchronizing signal separator and amplifier 310. The circuit 310 is adapted to derive the synchronizing signal component from the line-sequential color image signal and amplify the same for application to a vertical oscillation and deflection output circuit 312 and to a horizontal oscillation and output circuit 313. The outputs of both deflection output circuits 312 and 313 are applied to the deflection yoke 307 in the picture tube 100 thereby causing the electron beam to deflect vertically and horizontally to form a raster on the image screen.

The horizontal oscillation and deflection output circuit 313 supplies a horizontal pulse to the gate circuit 311 and to a high-voltage generator 314.

The output of the high-voltage generator 314 is supplied to the secondary winding 315(2) of the color switching signal transformer 315, to the focus grid 305 of the picture tube 100 and to the image screen 306. At the same time, the horizontal pulse ("H" pulse) from the generator 314 is applied to a focus voltage generator and screen voltage generator 316. The high voltage to the focus grid 305 and to the screen 306 is intended to control the electron beam emitted from the gun.

The output of the focus and screen voltage generator 316 is applied to the second grid 302 of the picture tube 100 and to the anode 303 for effecting the emission of the electron beam from the electron gun toward the image screen. The first grid 301 of the picture tube 100 is grounded.

The circuit arrangement just mentioned is well known in the art of a television receiver and hence, will require no further explanation.

The gate circuit 311 is adapted to receive the line-sequential color image signal including the instruction signal and the horizontal pulse ("H" pulse) from the circuit 313 and operate for the duration of each horizontal pulse to allow the passage therethrough of the color instruction signal similar to a burst signal to a color synchronizing signal shaper 317.

The instruction signal is detected at the shaper 317 and modified into a pulse ("3H" pulse) such as shown at FIG. 26 which is then applied to a blocking oscillator 318 adapted to compensate for the "3H" pulse. The "3H" pulse is corrected by the oscillator 318 for application to a storage counter 319 which is adapted to generate upon receipt of the "3H" pulse a voltage having three steps in its waveform, each step of which corresponding to one horizontal scanning cycle, as shown at FIG. 27. This stepped waveform voltage is applied to a color switching output circuit 320 where it is amplified for application to the primary winding 315(1) of the transformer 315.

On application of this stepped waveform voltage to the color switching grid 304 of the picture tube 100, there may be developed the three different color images on the image screen in a sequence determined by the potential or height of the step in the waveform of the voltage applied. This occurs at each horizontal scanning period and in such precise sequence agreeing with the sequence of the individual color components of the composite chrominance signal. This may be accomplished by bringing into agreement the sequence of different color phosphor strips on the fluorescent screen, the position of the color switching grid 304, the sequence of the color switching voltage and the color sequence of the composite chrominance signal. To secure this agreement is purely a matter of circuit engineering which may be easily done by those skilled in the art.

It will be readily understood that once the color sequence of the line-sequential color image signal is in register with the phosphor strip arrangement on the screen, both must be further brought into synchronous relation as well. This synchronism is achieved by the fact that the line-sequential composite signal includes three color components arranged in similar sequences alternating at every horizontal scanning cycle with the instruction signal inserted in the chrominance signal at every three horizontal scanning cycles ("3H"). Accordingly, as the color switching grid voltage is determined by the instruction signal with respect to that one color component signal, so the grid voltages may be determined with respect to the other two color component signals, as this may be easily appreciated from the character of the three-stepped waveform voltage shown at FIG. 27, whose one cycle corresponds to three horizontal scanning cycles.

Reference to FIG. 4 shows an audio circuit comprising an audio amplifier 321 adapted to receive the signal from the video tape recorder 51, an audio output circuit 322 and a speaker 323. This audio circuit as well as that in the video recording apparatus 51 (though omitted in FIG. 3) is well known in the art and hence, will require no further explanation.

The description has thus far been rendered in connection with the various block diagrams utilized to explain the basic circuit arrangement of the invention. The invention will now be described in more detail in connection with specific embodiments which may be readily put into practice.

FIGS. 5(a)–(c), inclusive, are examples of an electrical circuit essential to the construction of the transducer unit 50 embodying the invention for translating the NTSC signal into a line-sequential type of signal including a color instruction signal component. The parts shown in these figures correspond to a frequency divider 128, a storage counter 129, a delay and shaper circuit 130, a waveform shaper 131, a demodulated wave shaper 132, a phase modulator 133, a color-difference signal demodulator 134, a color-difference signal amplifier 135 and a mixer circuit 119 illustrated in FIG. 2. The other parts of FIG. 2 are substantially the same as those in a conventional color television receiver and hence, will require no further explanation.

The frequency divider in FIG. 5(a) is adapted to receive the negative portion of the horizontal pulse ("H" pulse shown at FIG. 20) from the horizontal pulse shaper 122 and generate a pulse (shown at FIG. 21) having a cycle corresponding to three cycles of the "H" pulse.

This device 128 operates on the principles of a blocking oscillator and essentially comprises a parallel circuit of a resistor 506 and a condenser 507, a diode 509 and a transformer 503. Designated at 502 is a tank circuit resonant with a frequency about 1.5 times greater than the period of "3H" pulse and adapted to serve as a stabilizer for the blocking oscillator. The "H" pulse of FIG. 20 is supplied through a coupling condenser 504 to the base of a transistor 501 which is connected with one end of a series circuit of a primary coil 503(1) of the transformer 503 and a tank circuit 502. The other end of this series circuit is grounded. The emitter of the transistor 501 is connected with one end of a parallel circuit of a resistor 506 and a condenser 507, while the other end thereof is grounded.

The two secondary coils 503(2) and 503(3) of the transformer 503 are arranged so that a negative B-power voltage is applied through the coil 503(2) to the collector of the transistor 501, while other coil 503(3) is connected at one end thereof with the collector of the same transistor and utilized at the other end as an output terminal 508.

The above blocking oscillator generates a pulse having a cycle determined by the time constant of the condenser 507 and resistor 506 and a width largely determined by the natural resonance frequency of the transformer 503. The condenser and resistor 506 are determined in their time constants such that the cycle or period of the pulse just mentioned becomes slightly lower than the "3H" pulse. Thus, on application of a negative "H" pulse such as shown at FIG. 20, the blocking oscillator output pulse is synchronized with the "3H" pulse so that there may be developed at the output of the secondary coil 503(3) a positive "3H" pulse such as shown at FIG. 21. The tank circuit 502 is utilized to correct the curve of discharge by the condenser 507 and resistor 506 thereby forming a stable, trouble-free frequency divider.

The storage counter 29 of FIG. 5(a) generates a voltage stepped at three different points of its waveform upon reception of "H" pulse from the horizontal pulse shaper 122 and "3H" pulse from the frequency divider 128. The stepped waveform voltage thus generated has a cycle corresponding to three horizontal scanning cycles or each step of the waveform corresponds to one horizontal scanning cycle. The storage counter 129 essentially comprises a transistor 510, three diodes 511–513 and a condenser 514, said three diodes being connected in series. The negative poles of the diodes are grounded while their positive poles are adapted to receive the "3H" pulse from the frequency divider 128. The negative pole of the intermediately positioned diode 512 is adapted to receive a negative "H" pulse through the coupling condenser 515, while the other end for "3H" pulse input or positive pole of the diode 512 is connected with one end of the condenser 514, with the other end thereof being grounded, and further with the base of the transistor 510. To the collector of the transistor 510 is applied a negative B-power voltage, and this collector is grounded by the condenser inserted between it and ground in the negative B-power voltage circuit. The emitter of the transistor 510 is connected with an output load resistor having one end grounded.

The amplitude of the positive "3H" pulse is held more than two times greater than the amplitude of the negative "H" pulse. To the input end for the positive "3H" pulse is applied a negative B-power voltage so that the input end potential is held to zero during the duration of the positive "3H" pulse.

The positive pulse of the first positive "3H" pulse enters the circuit simultaneously as the negative pulse of the negative "H" pulse. The input end of the diode 511 to which is applied the "3H" pulse is held in zero potential by the positive pulse, while the simultaneously incoming negative pulse flows through the diodes 512 and 511 to the input of said diode, during which time the circuit potential is held nil. This circuit state continues until the next negative pulse is applied which tends to charge the condenser 514 without flowing toward the positive pulse input end which is more than two times greater in potential than the negative pulse. This charging potential continues until the next negative pulse is applied which similarly charges the condenser 514 because of the absence of positive pulse. The charging potential thus increases by two times and continues until the next negative pulse is applied which tends to flow into the positive pulse input end as a positive pulse is simultaneously applied. At which time, the electric charge thus far accumulated becomes nil with the result that the circuit potential is held at zero, and this zero potential continues until the next negative pulse is applied. The subsequent circuit operation remains the same with the condenser 514 charged and discharged. As the charging voltage for the condenser 514 changes consecutively in three different steps, the base voltage of the transistor 510 accordingly changes so as to provide a voltage of the character having three steps in waveform. This stepped waveform voltage changes at each horizontal pulse period and hence, has a complete cycle corresponding to three horizontal scanning cycles as shown at FIG. 12.

The "3H" pulse from the frequency divider 128 is delayed in time and modified to a suitable width by the delay and shaper circuit 130 which comprises a combination of two one-shot multivibrators 130(1) and 130(2) consisting of an integration circuit having connected to its input end with condensers 517, 519 and resistors 518, 520. Each multivibrator consists of a first stage of transistors 521 and 523 and a second stage of transistors 522 and 524, as is the case with a conventional multivibrator construction.

The positive "3H" pulse from the frequency divider 128 is applied with the front porch thereof as a trigger pulse to the multivibrator 130(1) through the integration circuit of condenser 517 and resistor 518. Consequently, there may be obtained a negative pulse of suitable width at the first stage transistor 521. This negative pulse is applied with the back porch thereof as a trigger pulse to the multivibrator 130(2) through the integration circuit of condenser 519 and resistor 518 and through the diode 526. The output of the second stage multivibrator 130(2) has a delay corresponding to the pulse width from the first stage multivibrator 130(1). Thus, there may be obtained at the second stage transistor 524 a positive pulse of suitable width.

The waveform shaper 131 is adapted to modify the three-stepped waveform voltage from the storage counter 129 for application to the second band-pass amplifier 124 thereby to compensate for the compression ratio of the color composite video signal. The waveform shaper 131 consists of two known transistor pulse amplifiers 528 and 529 coupled by a condenser 527 as illustrated at FIG. 5(a), and it is adapted to shape the voltage from the counter 129 into a square wave for application to the second band-pass amplifier 124. The pulse amplifier 528 has its output flow to the collector when its input becomes negative and hence, amplifies the negative portion of the stepped waveform thereby to provide a positive square wave. The pulse amplifier 529 has its output flow to the collector conversely when a positive signal is applied, and hence, amplifies the output of the pulse amplifier 528 or positive square wave thereby to provide a negative square wave.

The modulated wave shaper 132 is adapted to receive the three-stepped waveform voltage (shown at FIG. 12) from the storage counter 129 and modify said voltage to that which is shown at FIG. 13 as required for application to the phase modulator 133. The shaper 132 is one of the transistor amplifier circuits adapted to receive the stepped-waveform voltage shown at FIG. 5(a) through the coupling condenser 531 to the transistor 532 whose output is then supplied to the phase modulator 133.

This modulator determines the bias voltage to the transistor 532 to set its operation point so that the stepped-waveform is amplified and cut at its upper portion to a predetermined height.

The phase modulator 133 receives the reference signal or output of the crystal oscillator 127 and the shaped three-stepped waveform voltage or output of the modulated wave shaper 132 shown at FIG. 13 and modulates the phase of the reference signal in accordance with the potential of the stepped waveform applied. The reference signal thus phase-modulated is applied as a detection axis for demodulation to the color-difference signal demodulator 134. The phase-modulator 133, as shown at FIG. 5(b), comprises a buffer 133(1), a continuous wave transformer 133(2) and a variable reactance circuit 133(3), and is adapted to amplify the output of the crystal oscillator 127 (reference signal=3.58 megacycles) through the coupling condenser 533 and supply the same to the primary coil 535 of the continuous wave transformer 133(2).

The buffer 133(1) may be of any known type but the use thereof is intended not only for signal amplification but also for preventing the signal in the subsequent stage of circuit from affecting the preceding stage of circuit.

The continuous wave transformer 133(2) has its secondary coil 536 provided centrally with an intermediate tap 537 which is connected across the lead 538 to the color-difference signal demodulator 134. The secondary winding 536 is connected at one end 539 thereof with a negative B-power source through suitable resistor 540 and grounded through condenser 541. The other end 542 of the secondary winding 539 is connected by lead 545 to the output end of the shaper 132 through condenser 543 and coil 544. Connected intermediate between condenser 543 and coil 544 is one end of a variable-capacity diode 546. The other end of this diode is grounded, and the opposite end of the coil 544 is grounded through condenser 547.

B-power is supplied to the lead 545 through resistors 548 and through variable resistor 550. These resistors are adapted to maintain the circuit potential at a predetermined value.

The secondary winding circuit of the continuous wave transformer 133(2) is represented by an equivalent circuit in FIG. 7 wherein the reference character X denotes a variable reactance circuit 133(3) including a capacitive reactance formed with condenser 543 and variable-capacity diode 546 and an inductive reactance provided by coil 544, and the reference character R generally designates a resistor 540. The condenser 547 (FIG. 8) therein is a high-frequency bypass condenser.

Before giving detailed account of the complete above circuit function, the operation of the equivalent circuit represented in FIG. 7 will be first discussed.

In the circuit of FIG. 7 when a voltage $e_1$ is induced in the secondary winding 536 of the transformer 133(2) at one side 536(1) across the intermediate tap 537, a similar voltage will be induced at the other side 536(2) of the tap. Now, considering how the voltage $e_0$ varies between point 537 and point 551 according as the variable reactance X is changed, it will be seen that with the reactance X held at 0, the voltage $e_0$ remains equal to the voltage $e_1$ and its phase remains unchanged as shown in FIG. 9(a).

As the variable reactance X changes to a certain inductive reactance, the induced voltage $e_0$ has a phase considerably behind that of the initial voltage $e_1$ as may be obvious from the vector representation in FIG. 9(b). In which instance, the internal impedance of the power supply $e_1$ should be held sufficiently low as compared with the resistance R. Conversely, as the reactance X becomes capacitive, the induced voltage $e_0$ gains in phase with respect to the initial voltage $e_1$, as seen from the vector representation of FIG. 9(c). It follows that the induced voltage $e_0$ may have a phase variation within the range of FIG. 10 indicated by the dotted line if the variable reactance X is automatically changed between capacitive and inductive with the value of each of the resistor R and the variable reactance X properly set.

Turning back to the variable reactance circuit 133(3) as illustrated in FIG. 8 the variable condenser $c$ is in reality a diode 546 having a capacity electrically variable with a bias voltage applied thereto. With the capacity of this condenser changing in three steps, the composite reactance in the circuit changes accordingly in three steps. It is also obvious that with a three-stepped waveform voltage applied to the diode 546, the composite reactance of the variable reactance circuit 133(3) changes likewise in three steps.

Considering the above circuit concept in connection with the equivalent circuit of FIG. 7, the variation in the reactance with the three-stepped waveform voltage eventually equals the reactance X and hence, the voltage between point 537 and point 551 remains constant in magnitude but changes in phase in three steps.

Turning further back to the electrical circuit arrangement of FIG. 5(b), it will be understood that the output ends of point 537 and point 551 in FIG. 7 correspond to lead 538 of the phase modulator 133 of FIG. 5(b) and ground, respectively, and therefore, there are made available from the phase modulator 133 three sequential signals (reference signals) which have their respective phase modulated by the three-stepped waveform voltage. The signal of 3.58 megacycles or the output of the crystal oscillator 127 remains constant in frequency either through the buffer 133(1) or the continuous wave transformer 133(2); hence, the output of the phase modulator 133 remains constant in frequency (3.58 mc.) and in magnitude.

Reference is here had to FIG. 15 which graphically displays the phase angles of the output voltage as plotted against the biasing voltage applied to the diode 546. From this curve, it will be appreciated that three individual signals different in phase may be obtained by determining the proper potential of the bias to the diode.

The modulation characteristic curve of FIG. 15 is subject to certain variations with the value reactance of each of the condensers 543, 547, coil 544 and diode 546 in the variable reactance circuit 133(3) in the phase modulator 133.

The steps in the waveform of the signal voltage may be varied in height to agree with corresponding detection axes having different phase angles according to the NTSC system as illustrated in the vector diagram of FIG. 11.

The circuit illustrated in FIG. 2 represents the case where the voltage having three equally high steps in its waveform is used which is formed by utilizing the non-liner portion of the modulation characteristic curve in FIG. 15.

The variable reactance circuit 133(3) in the circuit of FIG. 5(b) has such a frequency-reactance characteristic as shown in FIG. 14 wherein the curve $X_1$ represents the case where a voltage corresponding to the top step of the three-stepped waveform is applied to the variable-capacity diode 546; the curve $X_2$ represents the case where a voltage corresponding to the middle step of the waveform is applied to the diode 546, and the curve $X_3$ represents the case where a voltage corresponding to the bottom step of the waveform is applied to the diode 546. The frequency at which the voltage is phase-modulated is constant at 3.58 megacycles; therefore, the reactance value of each of the curves $X_1$, $X_2$ and $X_3$ on the 3.58 mc. line in the graph of FIG. 14 corresponds to that of each of the three steps in the waveform. The reactance on the curve $X_1$ is inductive, that on the curve $X_2$ is zero, and that on the curve $X_3$ is capacitive, each of which determines the phase angle of the voltage thereby to provide a modulating output as vectorially illustrated in FIG. 11.

Now, the apparatus utilized for the generation of the stepped-waveform voltage according to the present invention will be described below to make the invention more specifically understood.

The demodulator circuit 134 comprises a transistor 552 and a second band-pass transformer 553 as shown in FIG. 5(b). The demodulator 134 is so arranged that the chrominance signal or the output of the band-pass amplifier 124 is applied to the primary winding 553(1) of the second band-pass transformer 553, while the signal from the secondary winding 553(2) thereof is supplied to the emitter of the transistor 552 to the base of which is supplied the output of the phase modulator 133 and from the collector of which is obtained a demodulated output. The emitter of the transistor 552 is connected to ground across the secondary winding 553(2) of the transformer 553 and the emitter resistance 554 connected in parallel with a bypass condenser 555. Accordingly, the ground side of the phase modulator 133 is connected across the bypass condenser 555 to the emitter of the transistor 552, and the secondary winding 553(2) of the transformer 553 is connected at one end thereof to ground.

Applying to the demodulator 134 the chrominance signal from the band-pass amplifier 124 and simultaneously the modulating signal (reference signal=detection axis) from the phase modulator 133 develops a demodulated signal, namely, a color-difference signal between the collector of the transistor 552 and ground. The modulating signal, as already discussed in connection with FIG. 11, has three different phase points which serve as references for the demodulation of a red, a green and a blue color-difference signal. Sequential application of these three signals in the order named to the demodulator 134 results in the supply of a red color-difference signal $R-Y$, a green color-difference signal $G-Y$ and a blue color-difference signal $B-Y$ sequentially in the order named during each horizontal scanning period.

The color-difference signal amplifier 135 is adapted to supply a carrier wave, after processed through a filter circuit 558, said carrier wave being included in the color-difference signal of the output of the demodulator 134. The transistor 556 may be of any ordinary type transistor amplifier.

The gate oscillator 136 receives the "3H" pulse shown in FIG. 22 and delayed and shaped by the delay and shaper circuit 130 and during the time of that pulse provides an instruction signal such as shown in FIG. 24 similar to a burst signal and having a cycle corresponding to three horizontal scanning cycles ("3H"). The oscillator 136 essentially comprises a transistor 559, a transistor 560 and a tank circuit 561 similar to a Hartley circuit construction. This gate circuit is normally held in "ON" position and switched off upon reception of the shaped "3H" pulse. The switch-on action of the gate circuit causes a large-capacity condenser 562 to connect in parallel with the tank circuit 561 of the Hartley oscillator thereby short-circuiting both ends of the tank circuit 561 and thus stopping the oscillation.

In the presence of the "3H" pulse, the gate circuit is switched to "OFF" position thereby disconnecting the condenser 562 to release the short-circuited ends of the tank circuit 561, and during which time, the oscillator is energized to give a color instruction signal such as shown in FIG. 24. In the absence of this gate circuit, there may be obtained a continuous oscillation output as shown in FIG. 23.

Designated at 563 is a condenser adapted to allow the passage of AC signal alone, and at 564–566 are bias resistors.

The mixer circuit 119 is adapted to mix the luminance signal from the amplifier 116, the line-sequential color-difference signal from the amplifier 135 agreeing in time with the luminance signal and the color instruction signal from the gate oscillator 136 thereby forming a complete color image signal in a line sequence for application to the monochrome video recorder 51. The mixer circuit 119 consists of a combination of three low-impedance amplifiers 119(1)–119(3), a matrix circuit 119(4) (FIG. 5c), an amplifier 119(5) and a low-impedance output amplifier 119(6), as shown in FIG. 5(c). The three low-impedance amplifiers 119(1)–119(3) are essentially transistors 567–569, of which 119(1) is adapted to receive the luminance signal from the amplifier 116 through a coupling condenser 570, 119(2) is adapted to receive the color-difference signal from the amplifier 135 through a coupling condenser 571 and 119(3) is adapted to receive the instruction signal from the gate oscillator 136 through a coupling condenser 572, outputs of these transistors being supplied to the matrix circuit 119(4).

The matrix circuit 119(4) consists of a radial combination of resistors 573–576 is adapted to mix the luminance signal, color-difference signal and color instruction signal from the low-impedance amplifiers 119(1)–119(3) thereby forming a line-sequential color image signal for application to the amplifier 119(5) through coupling condenser 577. The amplifier 119(5) essentially comprises a transistor 578 and is adapted to amplify the image signal for application to the low-impedance output amplifier 119(6) which essentially comprises a two-stage amplification circuit of transistors 580 and 581. The output signal of the amplifier 119(5) is transmitted at sufficiently low output impedance so as to permit the connection by a coaxial cable with the magnetic recording and reproducing apparatus 51.

The color instruction signal is delayed by the delay and shaper circuit 130 so that it is positioned at the back porch of the line-sequential color image signal thereby holding the signal from affecting the reproduce picture and eventually simplifying the color television receiver 52.

Reference to FIG. 4 shows the color image reproducing apparatus or color television receiver 52 which is of the type well known to those skilled in the art except for some of the component circuits including a gate circuit 311, a color synchronizing signal forming circuit 317, a blocking oscillator 318, a storage counter 319 and a color switching output circuit 320 which will be dealt with in some detail as follows:

The gate circuit 311 essentially comprises a transistor 582 and a tank circuit 583 resonant with the color instruction signal as shown in FIG. 6. To the base of this transistor 592 is applied a line-sequential color image signal including a color instruction signal from the first video amplifier 308 through a coupling condenser 584. Also to the same base of the transistor is applied a negative horizontal pulse ("H" pulse) from the horizontal oscillation and deflection output circuit 313 through a resistor 585. The negative horizontal pulse just mentioned is the voltage utilized to operate the transistor 582. The base and emitter of the transistor 582 are grounded across bias resistors 586 and 587, respectively. The emitter bias resistor 587 is connected with a bypass condenser 588. The collector of the transistor 582 is connected with one end of the tank circuit 583, the other end thereof being connected to a negative B-power supply. The transistor is thus grounded in an AC fashion between a large-capacity condenser and the B-power circuit.

With this construction, the transistor 582 is energized by the negative horizontal pulse ("H" pulse) from the circuit 313. Since this transistor circuit is provided with the tank circuit 583, it is switched to open when the negative horizontal pulse and the color instruction signal are applied simultaneously, so that the latter signal is derived at the collector of the transistor 582. As the color instruction signal is inserted at the back porch of the composite image signal, the transistor circuit 582 is held in energized state during the time period of that color instruction signal and in deenergized state during the rest of time period, so that the color instruction signal alone is derived in its original state from the color composite video signal.

The color synchronizing signal forming circuit 317 is a known detection circuit as shown in FIG. 6 and adapted to detect the color instruction signal for reproduction of the "3H" pulse in negative phase. The circuit 317 comprises a diode 589 connected in the negative direction and has a condenser 590 connected between its output end and ground. Designated at 591 and 592 are bias resistors.

The blocking oscillator 318 converts the "3H" pulse (FIG. 26) from negative to positive and at the same time, compensates the pulse in a manner similar to the frequency divider 128 discussed in connection with the transducer unit 50.

It is to be noted that the output of the oscillator 318 is invariably the same whether its input is a negative "H" pulse or a negative "3H" pulse, because the time constants of the resistor and condenser connected with the emitter are set at "3H."

The storage counter 319 receives a positive "3H" pulse from the blocking oscillator 318 and a negative "H" pulse from the horizontal oscillation and deflection output circuit, and generates a voltage having three steps in its waveform, each of which steps corresponding to one horizontal scanning cycle. The operation of this counter 319 is the same as the storage counter 129 already described in connection with the transducer unit 50.

The color switching output circuit 320 amplifies the stepped waveform voltage from the counter 319 for application to the primary winding 315(1) of a color switching drive transformer 315, and is well known, requiring no further description herein.

In connection with FIG. 16, the color burst signal is the above composite video signal, and in the same figure designated at 600 is the synchronizing signal; at 601 is the burst signal; at 602 is a white color signal; at 603 is a yellow color signal; at 604 is a cyanic color signal; at 605 is a green color signal; at 606 is a magenta color signal; at 607 is a red color signal and at 608 is a blue color signal, these color components being represented in percent (%). The luminance signal component in the signal of FIG. 16 is represented in FIG. 17, while the chrominance signal is represented in FIG. 18. The individual color components have different phases as shown in FIG. 18.

In accordance with the present invention, as in the case with any conventional color television devices, there are treated only three primary colors; viz. red, green and blue, each of which is derived for every horizontal scanning period. The resulting color-difference signal is a simple voltage signal superimposed upon a brightness signal, and hence, the resulting color image signal is substantially similar to the luminance component of the NTSC signal.

Having thus described the basic concept and circuit construction of a color television signal recording and reproducing system embodying the invention, it will be understood that the use of this system permits the application of a conventional monochrome video tape recorder readily for recording and reproducing a color television signal with satisfactory results. The whole equipment including a monitoring device; viz. television receiver, may be built compact and light-weight so that it may be readily put to use at home.

While the invention has been described with particular reference to the NTSC signal, it will be obvious that the invention can be equally applied to the SECAM, PAL or other systems handling the subcarrier modulated by the chrominance signal and multiplexed within the monochrome video band.

As a monitor for the system of the invention, there may be used not only a single electron gun type Lawrence tube but also a beam index type of tube such as Apple tube or even a shadow-mask three-electron gun type of picture tube in so far as the line-sequential color reproducing method of the invention is used.

While there have been described and illustrated what are at present considered to be the preferred embodiments of this invention, it will be obvious to those skilled in the art that various changes and modification may be made therein without departing from the invention, and it is therefore intended to cover all such changes and modifications as fall within the appended claims.

What is claimed is:

1. A color television signal recording and reproducing system comprising a frequency divider for converting a horizontal pulse having a cycle corresponding to one horizontal scanning period into a pulse having a cycle corresponding to three horizontal scanning periods; a transmitter operating on a frequency suitable for use as a color instruction signal; a gate circuit connected with said frequency divider and said transmitter for deriving a pulse period from said frequency divider and the output from said transmitter; a means for applying the color instruction signal derived from said gate circuit at every three horizontal scanning periods to a line-sequential signal comprising a luminance and a chrominance component and inserting said color instruction signal into a specific color signal thereby to form a composite chrominance signal; a magnetic recording and reproducing unit for recording a signal having a relatively narrow bandwidth for recording and reproducing said composite chrominance signal; a means for deriving said color instruction signal from the reproducing output signal of said recording and reproducing unit; a means for driving a stepped wave generating circuit by said color instruction signal wherein said stepped wave comprises three different steps with its cycle coresponding to three horizontal scanning periods; and a means for applying said stepped wave to the color switching grid of a subsequent picture tube.

2. A color television signal recording and reproducing system as defined in claim 1, further comprising a switch for directly connecting a composite chrominance signal producing unit and a recording and reproducing unit.

3. A color television signal recording and reproducing system as defined in claim 1, further comprising a waveform shaping circuit for shaping the pulse derived from said frequency divider.

4. A color television signal recording and reproducing system as defined in claim 1, wherein a frequency signal of 1 mc. is used as a color instruction signal.

References Cited

UNITED STATES PATENTS

| | | | |
|---|---|---|---|
| 2,680,778 | 6/1954 | Werenfels et al. | 178—5.4 |
| 2,892,022 | 6/1959 | Houghton | 178—5.4 |
| 2,938,945 | 5/1960 | De France | 178—5.4 |
| 3,035,116 | 5/1962 | Raibourn | 178—5.4 |
| 3,099,709 | 6/1963 | Barry | 178—6.6 |
| 3,267,207 | 8/1966 | O Kazaki et al. | 178—5.4 |
| 3,303,275 | 2/1967 | Sugihara | 178—5.4 |

ROBERT L. GRIFFIN, *Primary Examiner.*

R. MURRAY, *Primary Examiner.*